Aug. 10, 1937.   O. C. RITZ-WOLLER   2,089,463
REAR VIEW MIRROR
Filed Feb. 27, 1936
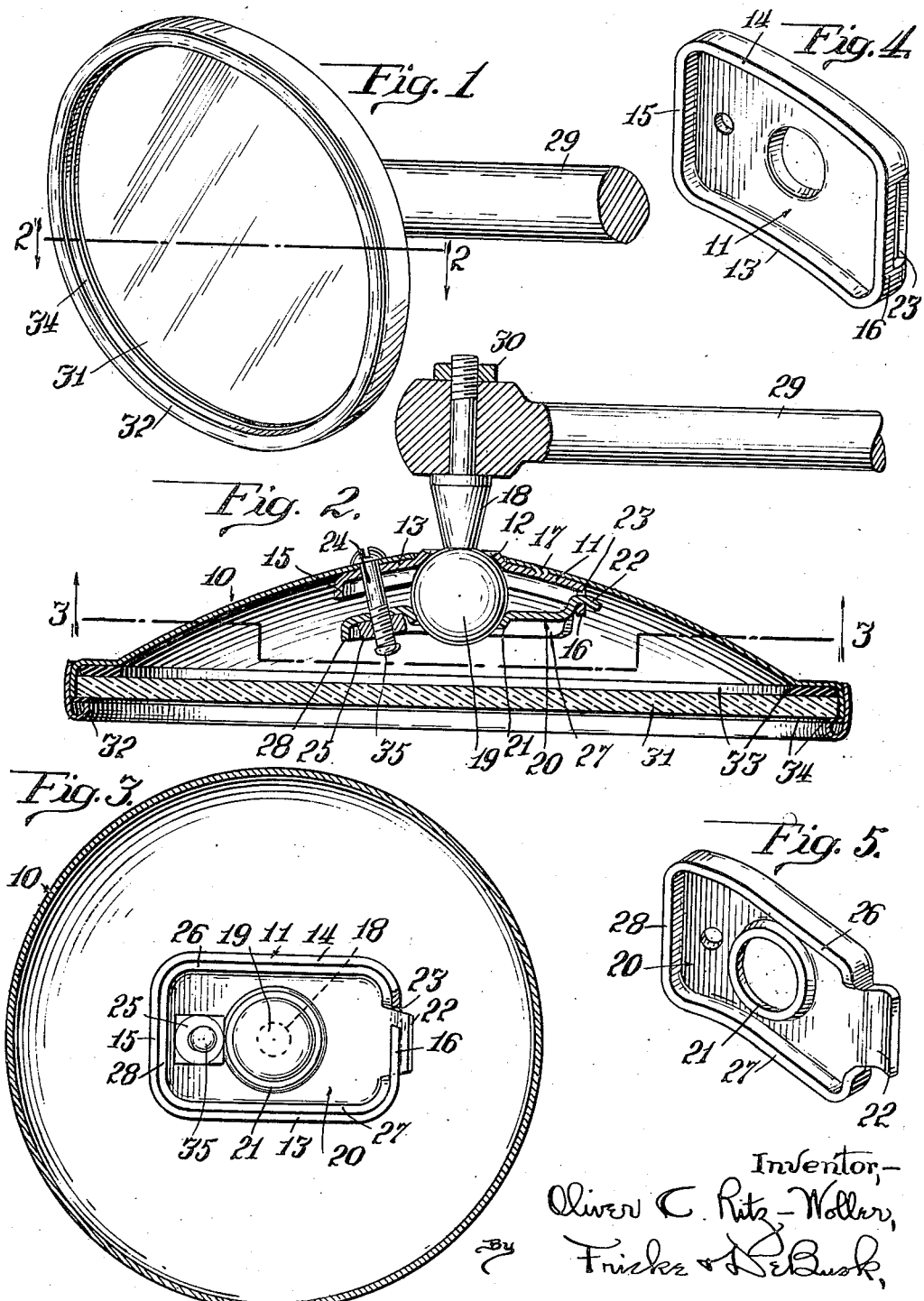

Patented Aug. 10, 1937

2,089,463

UNITED STATES PATENT OFFICE 2,089,463

REAR VIEW MIRROR

Oliver C. Ritz-Woller, Chicago, Ill.

Application February 27, 1936, Serial No. 65,985

1 Claim. (Cl. 287—21)

My invention relates to rear view mirrors for trucks or automobiles and it has for its object the provision of a new and improved form and arrangement of parts for mounting a mirror and for supporting it adjustably in position. It is one of the objects of my invention to provide an improved form of adjustable holding means by which a mirror may be held in any desired angular position within a wide range of adjustment without danger of the mirror being caused by jostling or vibration to change its position, the arrangement being such that the mirror may be adjusted through as small an angle as may be desired in any direction without any tendency for the mirror to return to the prior positions of adjustment.

It is another object of my invention to provide an improved arrangement of this type which can be produced and assembled very readily and cheaply, and which shall be adapted to stand up under hard usage without danger of the clamping means getting out of order or being broken by repeated clamping operations.

It is another object of my invention to improve devices of this type in sundry details hereinafter pointed out. The preferred means by which I have accomplished my several objects are illustrated in the accompanying drawing and are hereinafter specifically described. That which I believe to be new and desire to cover by Letters Patent is set forth in the claim.

In the drawing,—

Fig. 1 is a perspective view of the complete mirror equipped with my improved means;

Fig. 2 is a central horizontal section through my improved mirror as taken at line 2—2 of Fig. 1;

Fig. 3 is a vertical sectional view through my mirror taken at line 3—3 of Fig. 2; and Figs. 4 and 5 are perspective views of the clamping plates of my improved construction.

Referring now to the several figures of the drawing, in which corresponding parts are indicated by the same reference characters, 10 indicates a forwardly dished casing member formed of sheet metal pressed into form. In the arrangement shown, a plate 11 also formed of sheet metal is secured in position on the front face of the casing member 10, the plate 11 and the wall of the casing member 10 having openings therethrough, with a flange 12 formed on the plate 11 extending through the opening in the casing member 10. In the arrangement shown, the plate 11 is provided with flanges 13 and 14 along its sides, with a cross flange 15 across one end, and with a cross flange 16 across the opposite end, such flanges being formed integrally with each other and integrally with the plates so as to give the plate a maximum of strength. In the arrangement shown, the plate 11 is spot-welded to the casing at 17.

My improved means for mounting the mirror in position comprises a pin or bolt 18 extending backwardly through the openings in the plate 11 and the casing member 10 and having a substantially spherical head 19 formed on its front end so as to seat against the back wall of the casing comprising the wall portion reinforced by the plate 11. For holding the pin in position in its seat in the plate 11 in any desired angular position with respect to the casing member 10, I have provided a second plate 20 also formed of sheet metal having a central opening therethrough with a forwardly extending flange 21 about the opening. For holding the plate 20 in position I have provided one end portion thereof with a lug in the form of a hook 22 adapted to extend through an opening 23 in the end flange 16 of the plate 11 so as to provide a pivotal connection between the plates 11 and 20 at one side of the openings through the plate 11 and the casing member 10. At their opposite end portions, the plate 20 is connected with the plate 11 and with the adjacent portion of the casing member 10 by means of a screw-threaded bolt 24 which passes through registering openings in the several parts, being provided with a nut 25 on its forward end for tightening the plate 20 upon the forward face portion of the head 19 of the pin 18 as is shown in Fig. 2. In the arrangement shown, the nut 25 engages the flange 21 of the plate 20 so as to be held against rotation and so as to permit a tightening of the bolt by rotation of the bolt from the outside of the casing. In the arrangement shown, the plate 20 is provided with strengthening flanges 26 and 27 along its side edges and a cross flange 28 across one end, such flanges being formed integrally with each other and integrally with the plate 20 for giving the plate a maximum of strength and reinforcement.

By the use of my improved arrangement, the pin 18 is capable of being held securely in any adjusted position within a wide range with respect to the casing member 10, the tightening of the plates into gripping relation to the head 19 having no tendency to deform the head, with the result that the casing member can be adjusted through as small an angle as may be desired in any direction at any time and may be held firmly in such adjusted position regardless of any prior adjustments of the parts.

In the arrangement shown, the pin 18 extends through one end of a supporting arm 29 of any approved type, being locked in position therein by means of a nut 30 as is clearly shown in Fig. 2. As is also clearly shown in said Fig. 2, in the arrangement shown a mirror 31 is secured in the casing member 10 by means of an annular ring 32 of sheet metal crimped about the edges of the mirror and the casing member 10, gaskets 33 and 34 of cork or other suitable material being preferably employed between the mirror and the adjacent faces of the metal. As is clearly shown in Fig. 2, the forward end of the bolt 24 is preferably provided with a slightly enlarged head portion 35 for preventing the disconnection of the nut 25 therefrom.

By the use of my improved construction, I am enabled to produce my improved arrangement very cheaply, the parts being very readily produced in the form of stampings and being assembled with a minimum of labor and machine work. The arrangement is such that the parts are very strong and are subject to very little if any deterioration in use regardless of repeated adjustments of the mirror with respect to the supporting arm by a forcible turning of the mirror against the frictional grip of the head by the clamping plates or by repeated adjustments of the bolt 24. I have found in practice that my arrangement is very satisfactory in every way.

While I prefer to employ the form of construction as shown in my drawing, it is to be understood that my invention is not limited to such arrangement except so far as the claim is so limited by its terms.

I claim:—

In a structure for mounting and supporting a mirror, the combination of a forwardly dished casing member of sheet metal having a central opening through its wall, a plate secured on the inner face of the casing member, and having an opening therethrough with a flange about the opening and extending backwardly through the opening in said casing member, and having its edge portions turned forwardly in the form of a flange about the plate for reinforcing and strengthening the plate and the casing member, a pin extending backwardly through said openings and having a rounded head seating on the flange about said opening, a second plate having one end portion in the form of a hook engaging an opening through the flange of said first named plate at one end thereof, said second plate having its edge portions turned forwardly in the form of a flange extending about the plate from one side of the hook to the opposite side, said second plate having an opening therethrough with a forwardly extending flange thereabout against which the front face portion of said head seats, and a screw threaded bolt connecting the end portions of said plates with said casing member for holding said plates in gripping engagement with said head.

OLIVER C. RITZ-WOLLER.